United States Patent [19]
Liu

[11] Patent Number: 5,239,400
[45] Date of Patent: Aug. 24, 1993

[54] TECHNIQUE FOR ACCURATE CARRIER FREQUENCY GENERATION IN OFDM SYSTEM

[75] Inventor: Ming-Kang Liu, Tucson, Ariz.

[73] Assignee: The Arizona Board of Regents, Tucson, Ariz.

[21] Appl. No.: 727,972

[22] Filed: Jul. 10, 1991

[51] Int. Cl.⁵ .............................................. H04J 14/02
[52] U.S. Cl. .................... 359/125; 359/124; 359/127; 359/133
[58] Field of Search ............... 359/124, 125, 133, 132, 359/121, 187

[56] References Cited

U.S. PATENT DOCUMENTS

| | | | |
|---|---|---|---|
| 3,558,924 | 1/1971 | Lindell | 307/260 |
| 3,990,021 | 11/1976 | Hartmann et al. | 331/177 |
| 4,100,511 | 7/1978 | Wisbey | 331/107 |
| 4,635,246 | 1/1987 | Taylor et al. | 370/3 |
| 4,694,466 | 9/1987 | Kadin | 375/1 |
| 4,715,028 | 12/1987 | McMahon et al. | 370/3 |
| 4,800,555 | 1/1989 | Foschini | 370/3 |
| 4,834,483 | 5/1989 | Arthurs et al. | 350/96.16 |
| 4,835,782 | 5/1989 | Kaede et al. | 372/32 |
| 4,839,605 | 6/1989 | Trett et al. | 328/146 |
| 4,856,011 | 8/1989 | Shimada | 359/187 |
| 4,864,649 | 9/1989 | Tajima et al. | 359/187 |
| 4,873,681 | 10/1989 | Arthurs et al. | 359/124 |
| 4,897,830 | 1/1990 | Hill et al. | 370/4 |
| 4,989,201 | 1/1991 | Glance | 359/133 |

FOREIGN PATENT DOCUMENTS

3335353 11/1985 Fed. Rep. of Germany .
63-203026 6/1988 Japan .
987780 5/1983 U.S.S.R. .

Primary Examiner—Edward L. Coles, Sr.
Assistant Examiner—L. Pascal
Attorney, Agent, or Firm—Cahill, Sutton & Thomas

[57] ABSTRACT

An Optical Frequency Division Multiplexing system achieves close channel spacings and thus high density of communications channels in a particular frequency band by providing a very precise carrier frequency stabilization technique. Each laser-generated local carrier signal is locked to a corresponding reference signal. All of the reference signals are generated by a common tunable laser circuit that produces a sequence of bursts of successively higher frequencies determined by resonant points of a single Fabry-Perot filter. Each transceiver of the Optical Frequency Division Multiplexing system includes a frequency tracking circuit that converts received signals from the optical domain to the electrical domain and utilizes an intermediate frequency filter circuit and a servo control circuit to adjust the tunable laser frequency and lock it to the present reference frequency.

17 Claims, 3 Drawing Sheets

TECHNIQUE FOR ACCURATE CARRIER FREQUENCY GENERATION IN OFDM SYSTEM

BACKGROUND OF THE INVENTION

The invention relates to carrier hetrodyning and reference frequency generation techniques to achieve accurate carrier frequency generation in Optical Frequency Division Multiplexing (OFDM) systems.

Figure 1:
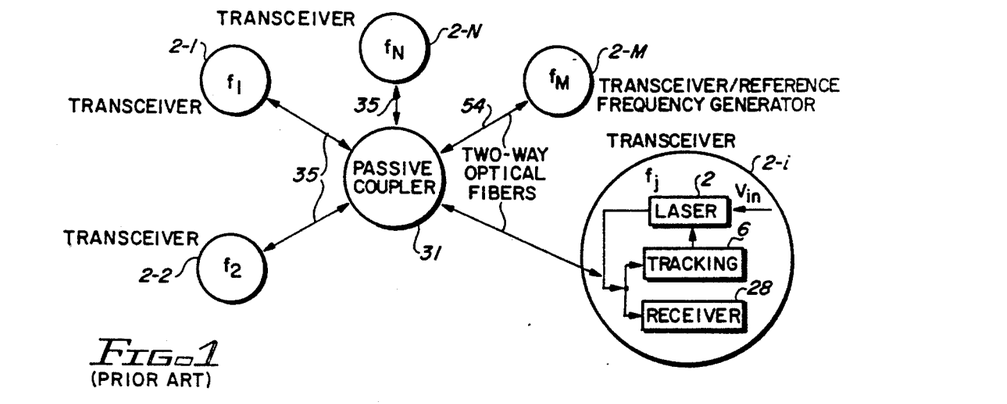
FIG. 1 is a diagram of a typical OFDM system.
Figure 2:
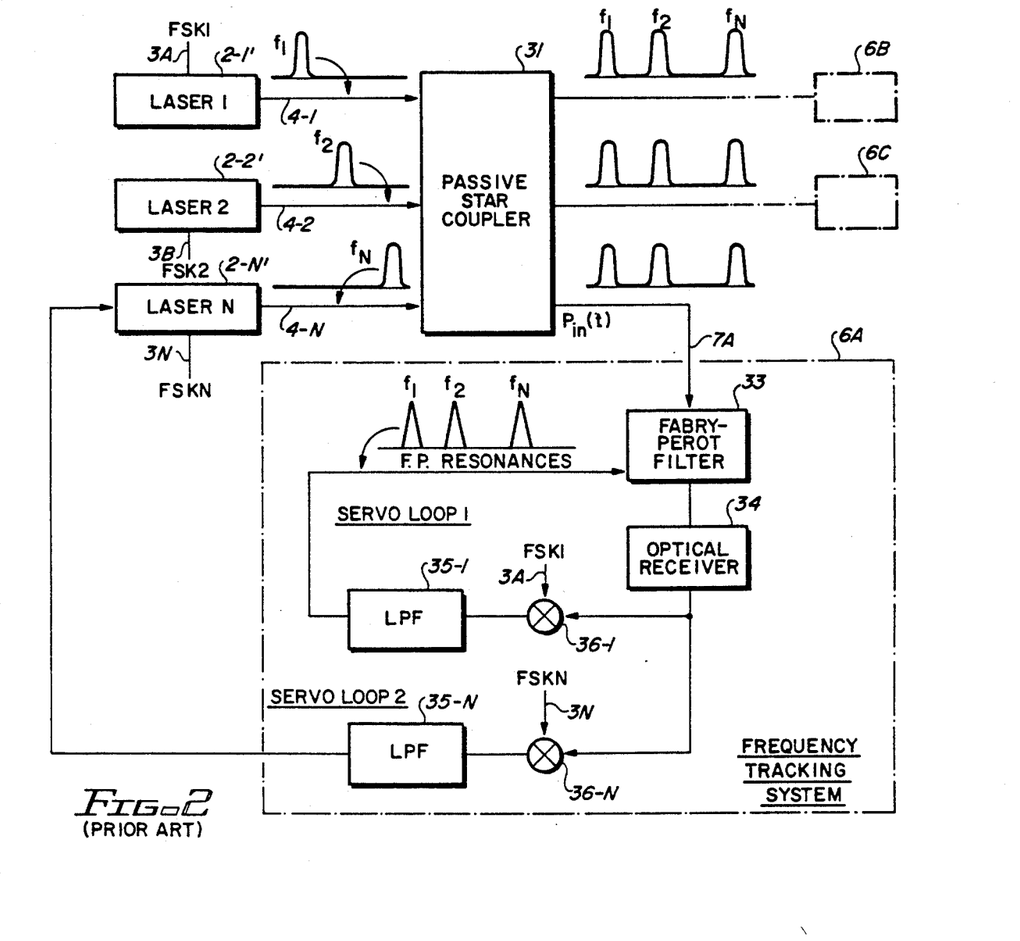
FIG. 2 is a block diagram of a prior art frequency tracking system used in each transceiver in the system of FIG. 1.

FIG. 1 shows the general configuration of an OFDM (Optical Frequency Division Multiplexing) system, and FIG. 2 discloses a prior art frequency tracking system used in each transceiver 2-1, 2-2, etc. of an OFDM system.

In FIG. 1, numerals 2-1, 2-2 ... 2-N, and 2-i, designate a group of transceivers each coupled by two-way optical fibers 35 to a passive coupler 31 that sometimes is referred to as a "star coupler". Numeral 2-M designates a transceiver containing a Reference Frequency Generator that produces a single reference frequency $f_M$ on optical fiber 54, which is used as the sole reference frequency for the entire OFDM system. Each transceiver, including 2-i, includes a laser 2 that transmits an optical signal back to star coupler 31, from which that optical signal is received by all of the other transceivers coupled to coupler 31. The frequency of the transmitted carrier signal produced by laser 2 is controlled by a frequency tracking system 6 that receives the various optical signals from coupler 31. A receiver circuit 28 of each transceiver receives those optical signals from coupler 31 via two-way optical fibers 35. An information data input signal $V_{IN}$ controls laser 2 to produce digital information by modulating the transmitted carrier signal produced by laser 2 so it produces bursts of light that represent logical "ones". In the OFDM system of FIG. 1, each "node" or transceiver sends out an optical signal by tunable laser 2 at a frequency different from the others. Passive coupler 31 combines or multiplexes all of the signals in the optical domain. This arrangement makes all of the optical signals visible to all of the receivers, which can tune in any channel by using a tunable filter for incoherent detection or a tunable laser to generate a local carrier for coherent detection.

Figure 1A:
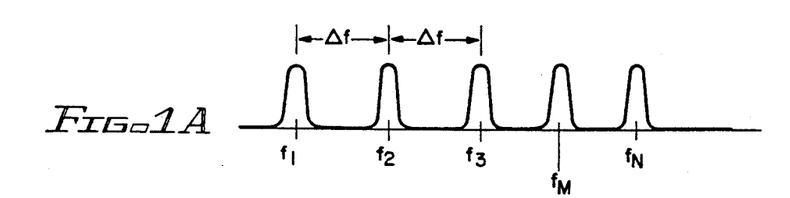
FIG. 1A is a graph illustrating the spectrums of carrier signals produced by each of the transceivers in FIG. 1.

The graph of FIG. 1A shows the spectrum of the carrier signals produced by each of transceivers 2-1, 2-2, etc. The frequency tracking system 6 in each transceiver "references" the transmitted carrier signal produced by that transceiver to the single reference frequency $f_M$. The spectrum of signals shown in FIG. 1A is applied to the receiver 28 and tracking circuit 6 of each transceiver in the system.

In an OFDM system as in FIG. 1, it is highly desirable that the channel separation be as close as possible, so that many channels can be provided in the system. Obviously, the channel separation $\Delta f$ cannot be very small unless each of the frequency spectrums $f_1, f_2 \ldots f_N$ is very stable, that is, if those frequencies do not change appreciably as a function of time, temperature, or other factors.

Referring to FIG. 2, passive coupler 31 of FIG. 1 is shown and the lasers in each of the transceivers 2-1, 2-2, ... 2-N also are shown and are designated by numerals 2-1', 2-2', 2-N', respectively. The frequency spectrums of these lasers are indicated by frequency spectrums $f_1$, $f_2, f_N$. Passive coupler 31 distributes output optical signals each of which contains all of the frequency spectrum components $f_1, f_2, f_N$ and also the sole reference frequency $f_M$. Numerals 6A, 6B, and 6C designate prior art frequency tracking systems that are included in the various transceivers.

Block 6A of FIG. 2 shows details of a prior art frequency tracking system. It includes a Fabry-Perot filter 33 that receives from coupler 31 a signal $P_{in}(t)$ containing all of the frequencies $f_1, f_2, \ldots f_N$ and reference frequency $f_M$. Fabry-Perot filter 33 produces an optical output which is detected by a photodetector 34 and converted to an electrical signal. That electrical signal is input to a first servo loop including mixer 36-1 and low pass filter 35-1, and also to a second servo loop including mixer 36-N and low pass filter 35-N. The output of low pass filter 35-1 is coupled to an input of Fabry-Perot filter 33. The feedback to the control input of Fabry-Perot filter 33 adjusts its resonance bands to align them in the desired relationship to the incoming optical signal $P_{in}(t)$ carried by optical fiber 7A. This arrangement allows frequencies in the signal $P_{in}(t)$ at the resonance frequencies of Fabry-Perot filter 33 to pass through Fabry-Perot filter 33 and be detected by a photodiode in optical receiver 34. The second servo loop (including low pass filter 35-N) modulates the frequency of laser N to adjust its frequency so that its transmitted carrier frequency will pass through Fabry-Perot filter 33.

A major problem with the system of FIG. 2 is that each of the frequency tracking circuits has a different Fabry-Perot filter 33, and those different filters are likely to have substantial differences in frequency spectrums and pass band separation. As a practical matter, this prevents the channel separation from being as small as desired, and therefore greatly reduces the number of communications channels that can be provided in the system of FIG. 1.

The above technique uses the reference frequency $f_M$, from which each carrier frequency $f_1, f_2$, etc. generated by the lasers 2-1', 2-2', etc. is kept at a corresponding constant frequency distance, respectively, and maintains the frequency difference in the "optical domain", by means of Fabry-Perot filter 33.

OFDM systems are different from so-called Wavelength Division Multiplexing (WDM) systems in that the channel separation for OFDM systems is much smaller, typically of the order of 0.1 nanometers in wavelength. Compared to the wavelengths of 1300 nanometers or 1500 nanometers commonly used in transmission in OFDM systems, this channel separation is extremely close and requires the wavelength accuracy of a practical useful tunable laser to be maintained within one to ten parts per million. Thus, precise frequency control is crucial for OFDM systems.

All existing methods of reference frequency generation for OFDM systems use only the one reference frequency $f_M$ shown in FIG. 1A for the other carriers $f_1$, $f_2$, etc. to follow. The main existing technique for generating accurate carrier frequencies is to use the one reference frequency for all other frequencies to "lock to" in the optical domain. Typically, a single Fabry-Perot filter is used for frequency locking. A Fabry-Perot filter has equal pass band separation, due to Fabry-Perot resonances. The filter outputs are used to indicate whether the laser frequencies are locked or not. That is, if a laser output frequency coincides with one of the pass bands of the Fabry-Perot filter, the optical receiver will detect a signal, which means that the frequency is locked. On the other hand, if the laser frequency has drifted outside the pass band, there is no signal going to the optical receiver. As a result, the Fabry-Perot filter drift determines the OFDM spectrum and channel separation.

A good single frequency laser has wavelength drift of approximately 0.09 nanometers per degree Centigrade, or sixty parts per million per degree Centigrade. A typical Fabry-Perot laser is worse, with drift of about 330 parts per million per degree Centigrade. To make HDWDM or OFDM useable, very precise frequency control is essential, and frequency drift due to temperature variations and other causes must be kept within very narrow ranges.

There are known stabilization techniques for tuning circuits of coherent hetrodyne receivers in which an input signal is mixed with a local oscillator signal and the result is detected by a photodiode. The output signal produced by the photodiode is amplified and sent to an intermediate frequency (IF) filter. The output of the IF filter is applied to the input of a detector circuit and also is applied by means of a servo loop to the local oscillator to stabilize the local oscillator frequency.

There is an unmet need for a technique for greatly increasing the data throughput of an OFDM system, and more particularly, there is a need for technique for greatly decreasing the channel separation therein.

SUMMARY OF THE INVENTION

It is an object of the invention to provide and maintain accurate channel separation in an OFDM system.

It is another object of the invention to provide more precise frequency locking of carrier frequencies in an OFDM system than previously has been achieved.

It is another object of the invention to provide a robust and cost-effective implementation for reliable, high-speed parallel computing that requires high bandwidth communications.

Briefly described, and in accordance with one embodiment thereof, the invention provides a first circuit that generates a plurality of optical reference signals of different frequencies during a plurality of corresponding successive time intervals, one for each OFDM channel, and a second circuit that locks an OFDM channel frequency with respect to one of the reference frequencies generated by the first circuit.

The first circuit, which is a reference frequency generator circuit, uses a first tunable laser to produce all reference frequencies used in the OFDM system. The laser is followed by a Fabry-Perot resonator that will pass the laser output if the laser frequency coincides with one of the resonator's passing bands. A first photodetector is used to convert the resonator's optical output to a corresponding electrical signal. A high level of the electrical signal indicates that the laser frequency is in one of the resonator's passing bands. The electrical signal is input to a control circuit that controls the laser output frequency. If the electrical signal from the photodetector is high, the control circuit output will be maintained at the same level for a predetermined time interval. During this interval, one of the reference frequencies is generated. The control output will be a stepped waveform to generate a plurality of reference frequencies, which correspond to a plurality of the resonator's consecutive passing bands.

The second circuit, which is part of a typical transceiver in the OFDM system, locks the OFDM channel frequency of a second tunable laser that transmits an optical signal modulated by a data input signal. The optical signal is sent to a passive optical coupler through an optical fiber. The coupler combines all laser-produced signals, including that from the first circuit and that modulated by data input signals. The second circuit includes a second photodetector that receives the combined optical signal through a second fiber. The photodetector converts the signal into an electrical signal. The electrical signal is proportional to the square of the combined optical signal, and consists of terms whose frequencies equal the difference or sum of two laser-produced signals in the combined optical signal. The electrical signal is input to an intermediate frequency (IF) filter followed by a peak detector. If the reference frequency for the second circuit that locks the corresponding OFDM channel frequency is present, and if the second tunable laser is being locked correctly, the peak detector output will be high. A servo circuit responsive to the peak signal produces an analog frequency control signal to lock the second tunable laser frequency.

DETAILED DESCRIPTION OF THE PREFERRED EMBODIMENTS

Figure 3:
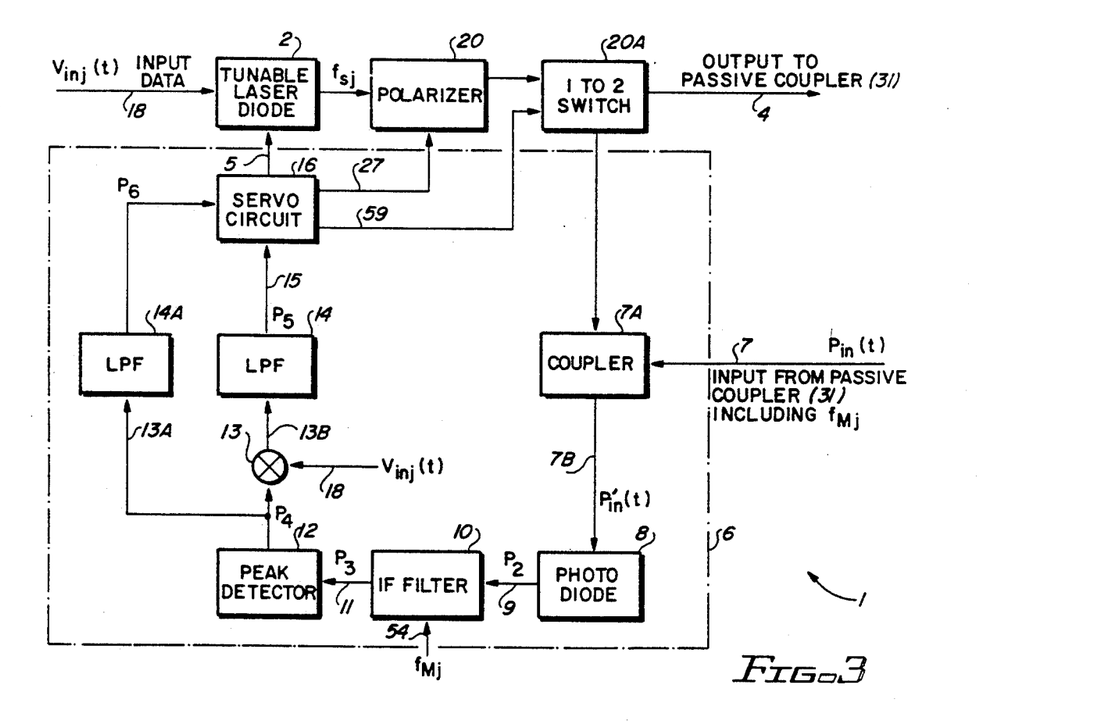
FIG. 3 is a block diagram of the frequency tracking circuitry of the present invention.

First, the structure of a typical transceiver circuit 1 including the novel frequency tracking of the present invention, is described. Transceiver 1 includes a tunable laser 2 which receives an input $V_{inj}(t)$ as input data, j being an integer. Tunable laser diode 2 produces an output signal of frequency $f_{sj}$ which is applied as an input to polarizer 20. The output of polarizer 20 is connected to one input of 1-to-2 switch 20A, the output of which is coupled by optical fiber 4 to passive coupler 31, as in FIG. 1.

The control input of tunable laser diode 2 is connected by conductor 5 to the output of a servo circuit 16. Servo circuit 16 produces a control signal on conductor 27 which is applied as an input to polarizer 20. Servo circuit 16 also produces a control output on conductor 59 which is applied to a control input of 1-to-2 switch 20A.

Another output of 1-to-2 switch 20A is connected by an optical fiber to a coupler 7A, another input of which receives the signal $P_{in}(t)$, which includes the reference frequency signals having the frequencies $f_{Mj}$, via optical fiber 7 from passive coupler 31. $P_{in}(t)$ also includes all of the frequency spectrum components of all optical signals distributed by passive coupler 31. Coupler 7A produces an output $P'_{in}(t)$ on optical fiber 7B which is applied as an input to a photodiode 8. The output of photodiode 8 is applied as signal P₂(t) on conductor 9 to the input of an IF filter (intermediate frequency filter) 10. IF filter 10 produces on conductor 11 an output P₃(t) which is applied as an input to peak detector circuit 12.

Peak detector circuit 12 produces an output signal p₄(t) on conductor 13A which is applied as an input to low pass filter 14A, the output of which produces the signal P₆(t) applied as an input to servo circuit 16. Conductor 13A also is applied as an input to mixer 13, which receives as another input on conductor 18 the signal $V_{in}(t)$. Mixer 13 has an output 13B connected to an input of low pass filter 14. The output of low pass filter 14 produces a signal P₅(t) on conductor 15, which is applied as an input to servo circuit 16.

In operation, tunable laser 2 receives a data input signal $V_{in}(t)$ on conductor 18, and produces an optical transmitted carrier signal 4 which can be modulated according to the information content of $V_{in}(t)$ The carrier frequency $f_{sj}$ of tunable laser 2 is controlled by a signal 5 from a servo circuit 16. The polarization of the output of laser 2 is also controlled by a polarizer 20 and servo circuit 16 to maximize the signal P₅. Polarizer 20 aligns the polarization of the output of laser diode 2 to the polarization of a reference signal of frequency $f_{Mj}$, subsequently described. If the output of laser diode 2 and the signal having the reference frequency $f_{Mj}$ are not of the same polarization, a strong signal, as is required for carrier frequency stabilization, cannot be obtained.

Numeral 6 designates the above mentioned frequency tracking system, which has an input connected to optical "receive fiber" 7. The signal $P_{in}(t)$ on optical fiber 7 includes all of the frequency components in the OFDM system of FIG. 2, including the present one of the reference frequency signals of frequencies $f_{Mj}$. Before the signal of frequency $f_{sj}$ is locked to its reference frequency, 1-to-2 switch 20A loops back the output signal from polarizer 20 back to coupler 7A. Therefore, fiber 7 initially does not contain the local output signal from laser 2.

There are two stages during the stabilization of the carrier frequency. During initial reference frequency acquisition, the local transmitter signal should not be connected to passive coupler 31 in order to prevent the unstabilized signal from interfering with proper system operation. To effectuate the necessary decoupling, 1-to-2 switch 20A controlled by a signal 59 produced by servo circuit 16 directs the carrier signal output of polarizer 20 to coupler 7A, which combines the output of polarizer 20 with the signal $P_{in}(t)$ via optical fiber 7 from the system passive coupler 31 (FIG. 1).

During the initial acquisition stage, the laser diode frequency $f_{sj}$ has not yet been locked relative to a reference frequency. If the reference frequency $f_{Mj}$ is present during the acquisition and is not locked by other tunable lasers, the signal P₆(t) from low pass filter 14A is zero, and is used to activate servo circuit 16. On the other hand, if $f_{Mj}$ has been locked by a tunable laser, the signal P₆(t) is high, and servo circuit 16 is not activated.

When servo circuit 16 is activated, its two outputs 5 and 27 are varied one at a time in large increments until P₅(t) can be measured by servo circuit 16. At that time the output voltage on conductor 5 will be adjusted until a maximum value of P₅(t) on conductor 15 is maximized. After this, the tracking system switches from the acquisition stage to the "tracking stage", wherein the laser diode output frequency $f_{sj}$ has been locked relative to $f_{Mj}$, and servo circuit 16 slowly varies its outputs on conductors 5 and 27 (that is, slowly compared to the information transmission rate of $V_{in}(t)$), if P₅(t) is sensed to be decreasing.

The operation of the frequency tracking system 6 is as follows. Photodetector 8 converts the optical signal on conductor 7B to an electrical signal P₂(t) on conductor 9. This is fed into the input of a conventional IF (intermediate frequency) filter 10. (IF filter 10 is essentially similar to IF filters in radio or optical hetrodyne receivers, so the details can be easily implemented by one skilled in the art.) An IF filter is essentially a narrow bandpass filter with a center frequency of $f_{IF}$.

The optical signal $P_{in}'(t)$ on optical fiber 7B can be expressed as:

$$P_{in}'(t) = A_M e^{j(2\pi f_{Mj}t + \Phi_M(t))} + V_{inj}(t) e^{j(2\pi f_{sj}'t + \Phi_j(t))} + \sum_{i \neq j} V_{ini}(t) e^{j(2\pi f_{si}t + \Phi_{si}(t))} \quad (1)$$

where i and j are integers used as summation indexes. The first term on the right side of equation (1) represents the present reference frequency signal, the second item represents the output from laser 2, and the third term in the summation represents all optical signals from other lasers in the system. Detector diode 8 then performs a direct detection function by squaring the amplitude of $P_{in}(t)$, which yields the equation $$P_2(t) = RA_M^2 + R \sum_i V_{ini}^2 + 2RA_M V_{inj}(t)\cos\{2\pi f_{IF}'(t) + \phi_s(t)\} \quad (2)$$

$$+ \sum_{i \neq j} 2RA_M V_{ini}(t)\cos\{2\pi (f_{si} - f_{Mj})t + \phi_{si}(t) - \phi_M(t)\}$$

where R is an optical-to-electrical conversion constant and $f_{IF}' = f_{sj}' - f_{Mj}$. Therefore, if the low frequency components of $$RA_{Mi}^2 + R \sum_i V_{ini}(t)$$

are outside of the IF band, and if the frequency of one of the remaining components of P₂(t) is within $f_{IF}$ of $f_{Mj}$, the IF filter output will be non-zero and contains only that term.

IF filter 10 produces P₃(t), which is fed into a peak detector circuit 12 that detects a peak amplitude of P₃(t) and produces that as signal P₄(t) on conductor 13A and feeds it into two low pass filters 14 and 14A. (See "Modern Electronic Circuits Reference Manual", Chapter 101 entitled "Voltage-Level Detector Circuits" by John Markus, McGraw-Hill, 1980, for an implementation of peak detector circuit 12.)

The peak detector output on conductor 13A is sent directly to low pass filter 14A, which is identical to low pass filter 14, and performs the function of detecting whether there is any high level input. A high value at the output P₅(t) of filter 14 indicates that the current reference frequency is being locked. During the initial acquisition stage, the output P₆(t) of low pass filter 14A is low if the present reference frequency is not locked by other frequencies. A high value of P₆(t) disables servo circuit 16 from performing its tracking function. Low pass filter 14A is used only during the initial acquisition stage.

After initial acquisition, $f_{Mj}$ is locked by $f_{sj}$. P₃(t) is given by the equation $$P_3(t) \approx 2RA_M V_{inj}(t)\cos(2\pi f_{IF}'(t) + \phi(t))H_{IF}(f_{IF}'), \quad (3)$$

where $H_{IF}(f_{IF}')$ is the frequency response of the IF filter.

Therefore, $P_4(t)$ can be expressed as $$P_4(t) = 2RA_M V_{inj}(t) H_{IF}(f_{IF}'). \quad (4)$$

If the present reference frequency is not locked by $f_{sj}$, but by another laser at $f_{si}(i \neq j)$, $P_4(t)$ is $$P_4(t) = 2RA_M V_{inj}(t) H_{IF}(f_{IF}). \quad (4')$$

Mixer 13 multiplies $P_4(t)$ with $(V_{inj}(t) - \overline{V_{inj}(t)})$. Therefore, the signal $P_5(t)$ produced at the output of low pass filter 14 is given by $$P_5(t) = 2RA_M \overline{V_{ini}(t)[V_{inj}(t) - \overline{V_{inj}(t)}]}H_{IF}(f_{IF}') \quad (5)$$

where $\overline{V_{inj}(t)}$ is the average value thereof.

Since $V_{ini}(t)$ and $V_{inj}(t)$ are statistically independent, $P_5(t)$ will be zero if $f_{Mj}$ is locked by $f_{si}$. This zero signal is used to tell servo circuit 16 not to track the present reference. frequency. Servo circuit 16 will be operational if $P_5(t)$ is non-zero or when $f_{Mj}$ is the reference frequency for $f_{sj}$.

Since the maximum value of $P_5(t)$ from equation (5) occurs when $f_{IF} = f_{sj} - f_{Mj}$ is at exactly the central frequency of the IF filter, the correct frequency of the output of laser 2 can be achieved by maximizing $P_5(t)$. Servo circuit 16 has three outputs, including output 5 to control the frequency of laser diode 2, output 27 to control the polarization produced by polarizer 20 on the output signal produced by laser diode 2, and output 59 to control 1-to-2 switch 20A.

A decrease of $P_5(t)$ may be caused by the drifting of the carrier frequency of laser 2 or by the above-mentioned misalignment of the polarizations of the reference signal and the local carrier. Servo circuit 16 then simply varies its outputs one at a time to slowly maximize $P_5(t)$. It should be appreciated that the servo control operation described above is merely exemplary, and may be implemented in various ways to achieve the same objective.

The "locked frequency" $f_{sj}$ of laser diode 2 is equal to $f_{Mj} + f_{IF}$. Therefore, it is necessary to use an IF filter 10 the center frequency $f_{IF}'$ of which is sufficiently close to the designed $f_{IF}$. This is different from prior schemes that use Fabry-Perot resonators to lock or stabilize carrier frequencies, as in FIG. 2. The significance of this difference is that the present frequency tracking technique occurs in the "electrical domain," rather than the "optical domain". In the electrical domain, a much smaller difference frequency $f_{IF}$ between the reference frequency and the local laser diode frequency can be achieved than in the optical domain. With the much smaller frequency $f_{IF}$ compared to $f_{sj}$, the accuracy $\Delta f/f_{IF}$ can result in a very small frequency drift percentage $\Delta f/f_{sj}$. For example, if $f_{IF}$ is one gigahertz and $\Delta f_{IF}$ is equal to ten megahertz, which represents a one percent error, the frequency drift percentage can be kept within 0.05 parts per million for the wavelength 1500 nanometers. This small drift percentage cannot be directly achieved in the optical domain. For example, the band separation of the Fabry-Perot resonator 33 shown in FIG. 2 can easily deviate a few percent from the designed value at optical frequencies.

Figure 3A:
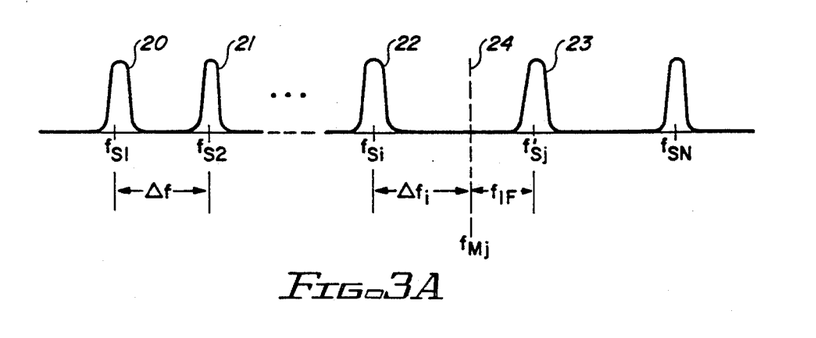
FIG. 3A is a graph of the frequency spectrum generated by the frequency tracking system of claim 3.

Therefore, the forgoing frequency tracking system is very precise, and as a result, the frequency spectrums of the different signal sources in the system, such as those designated by 20, 21, 22, and 23 all are very stable. Consequently, the channel separation $\Delta f$ (FIG. 3A) can be made very small, and a large number of communications channels can be fit within a predefined frequency band.

Figure 4:
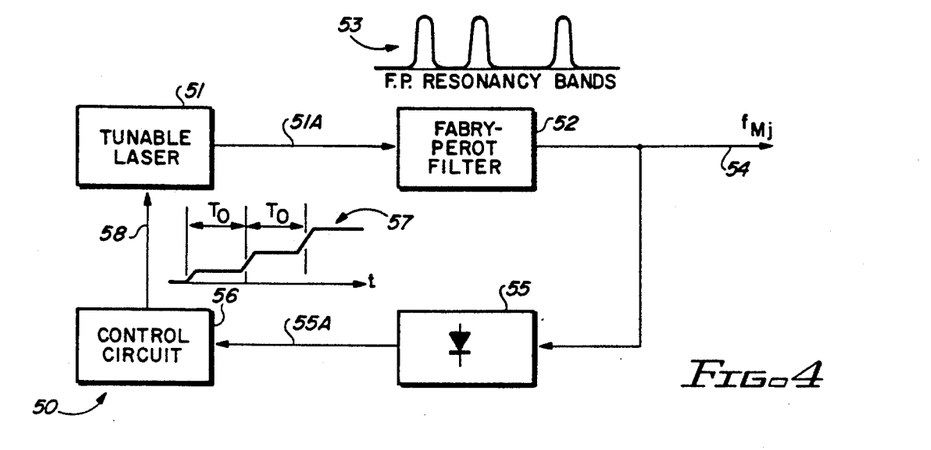
FIG. 4 is a block diagram of the reference frequency generation circuit that can be included in the system of FIG. 1.

In FIG. 4, numeral 50 is a block diagram of the circuit which generates the reference frequency $f_{Mj}$ (FIG. 3) referred to above. The structure of frequency generation circuit 50 is as follows. Tunable laser 51 has a control input connected by conductor 58 to the output of control circuit 56. The output signal of tunable laser 51 is carried by optical fiber 51A to a Fabry-Perot filter 52, the output of which is carried to passive coupler 31 (as in FIG. 1) by optical fiber 54 and has a frequency of $f_{Mj}$. Optical fiber 54 is applied to the input of a photodiode 55, the output of which is coupled by conductor 55A to an input of control circuit 56. Control circuit 56 produces the ramped control signal 57 that also is shown in FIG. 4.

Figure 5:
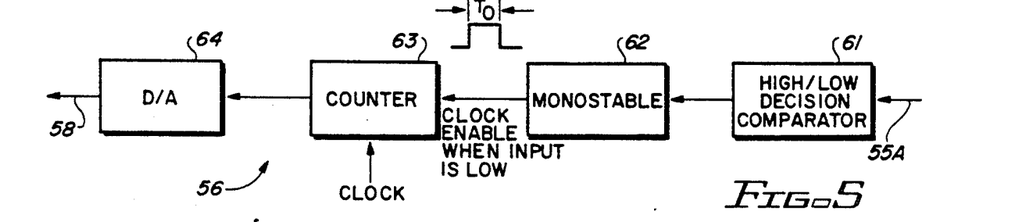
FIG. 5 is a block diagram of the control circuit 56 included in FIG. 4.

An implementation of control circuit 56 is shown in FIG. 5, in which conductor 55A is connected to the input of a comparator 61. The output of comparator 61 is connected to the input of a monostable circuit 62, the output of which produces a pulse having width $T_0$, as shown. The output of monostable circuit 62 is connected to an input of counter 63, which has a clock input. The output of counter 63 is connected to the input of a digital-to-analog converter 64, the output of which is connected to conductor 58.

In frequency generation circuit 50, the optical output of tunable laser diode 51 is passed through Fabry-Perot filter 52 having pass bands designated by a spectrum 53, also shown in FIG. 4, and produces the optical reference frequency signal $f_{Mj}$ on optical fiber 54. Photodetector circuit 55 converts the $f_{Mj}$ signal in optical fiber 54 to an electrical signal 55A which is applied to a control circuit 56. Control circuit 56 produces the stepped output waveform 57 on conductor 58, which is applied to the bias voltage input of tunable laser 51 to control the frequency of the output signal produced on optical fiber 51A. Each of the steps in waveform 57 has a predetermined duration of $T_0$, and each step results in a different corresponding optical frequency being produced on optical fiber 51A, and consequently results in a different reference signal frequency $f_{Mj}$ being produced by laser 51.

Thus, the reference frequency $f_{Mj}$ indicated in FIG. 3 has different values, one for each of the transceivers in FIG. 1. Convenient availability of all of the reference frequencies $f_{Mj}$ by means of the single laser 51 in FIG. 5 allows economical implementation of the highly accurate system described above with reference to FIG. 3.

An implementation of the control circuit 56 of FIG. 4 is shown in FIG. 5. The electrical signal 55A is applied to a comparator circuit 61 that produces a high output when $f_{Mj}$ is in one of passing bands of Fabry-Perot filter 52. When the comparator's output changes from low to high, it triggers the monostable circuit 62 to generate a pulse of duration $T_0$. During the duration $T_0$, counter 63 is inhibited. Therefore, the output of digital-to-analog converter 64, which generates the laser control signal 58, is stable. When the duration $T_0$ elapses, and the monostable circuit output becomes zero, counter 63 starts to advance at a given clock rate, producing one of the steep transitions of waveform 57 in FIG. 6 by digital-to-analog converter 64. The output signal on conductor 58 is used to bias tunable laser 51, and it will continue to increase until the frequency of the signal in optical fiber 51A reaches the next pass band 53 of Fabry-Perot filter 52, generating a signal of a new frequency fmj in optical fiber 54. That signal is detected by photodiode 55, producing an electrical signal on conductor 55A that causes comparator 61 to again trigger monostable circuit 62 and hold the output of digital-to-analog converter 58 stable for another $T_0$ duration.

Figure 6:
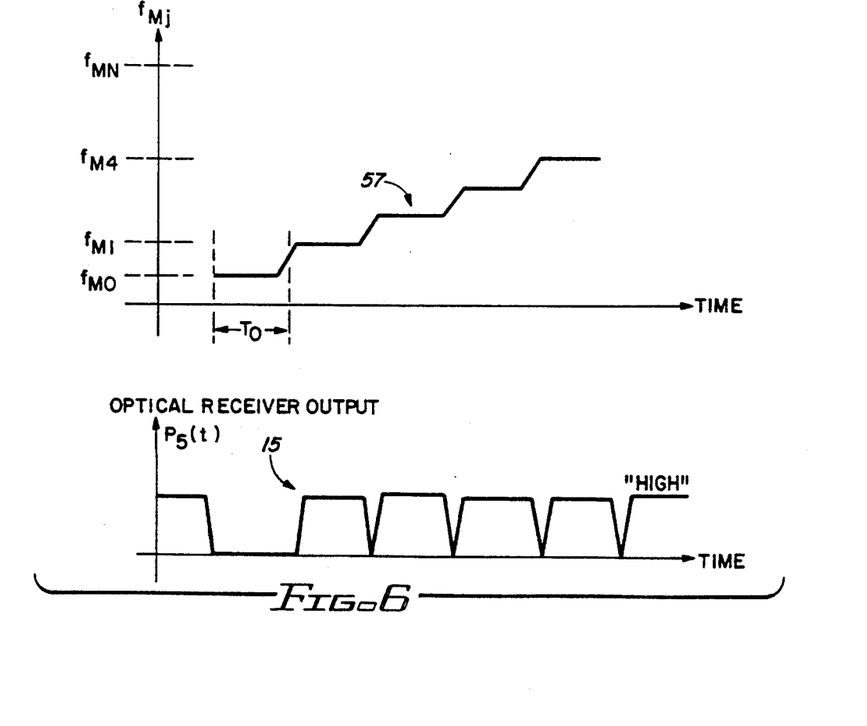
FIG. 6 is a timing diagram showing the reference frequencies produced by the circuit of FIG. 5 and the resulting signal $P_5(t)$ in FIG. 3.

FIG. 6 illustrates different master frequencies $f_{M0}$, $f_{M1}$... $f_{MN}$ which are generated by the circuit of FIG. 4 as successive values of the master frequency $f_{Mj}$.

The above-described technique allows a single tunable laser source to generate as many reference frequencies as are needed. All of the reference frequencies are aligned to the corresponding reference frequencies by a single Fabry-Perot filter, so that stable and precise frequency differences can be easily accurately maintained among the various reference frequencies generated. The invention described is expected to be important to generating accurate carrier frequencies in lightwave technology, in which there are needs to transmit signals at higher speeds and needs to tailor the technology for more system applications. The invention allows higher signal transmission speeds without demanding higher speed electronics. It is believed that the invention will help the development of high bandwidth video communications such as high definition television and high speed parallel computing that require extensive real time communications among processors.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. In an optical frequency division multiplexing system, circuitry comprising in combination:
    (a) a first tunable laser responsive to an electrical data input signal and also responsive to an electrical frequency control signal and transmitting a data-modulated optical output signal via a first optical fiber to a passive coupler;
    (b) a second optical fiber carrying a plurality of laser-produced signals coupled by the passive coupler;
    (c) a reference frequency generating circuit operating to generate a plurality of optical reference signals each having a different reference frequency during a plurality of successive time intervals, respectively, and supplying the optical reference signals to the passive coupler;
    (d) a frequency tracking circuit including
        (i) a first photodetector receiving various optical signals from the second optical fiber and producing corresponding electrical signals including cross terms between the reference frequency signals and the data-modulated optical output signal;
        (ii) an intermediate frequency filter circuit receiving the electrical signals from the first photodetector including the cross terms therein, and producing an output signal if a frequency difference between a present reference frequency signal and a data-modulated signals in the electrical signal produced by the first photodetector is within the pass band of the intermediate frequency filter;
        (iii) a peak detector circuit receiving the output signal of the intermediate frequency filter and producing a signal representative of a peak of the output of the intermediate frequency filter circuit,
        (iv) a servo circuit responsive to the signal produced by the peak detector circuit for producing the electrical frequency control signal,
    whereby the optical output signal produced by the first tunable laser becomes locked to the present reference signal.

2. The circuit of claim 1 including a low pass filter circuit coupling the output of the peak detector circuit to an input of the servo circuit.

3. The circuit of claim 1 including a polarizer coupling an optical output of the tunable laser to the first optical fiber, the polarizer having a control input receiving an electrical control signal produced by the servo circuit.

4. The circuit of claim 1 including a mixer circuit coupling an output of the peak detector circuit to the input of the servo circuit, the mixer circuit multiplying the electrical data input signal by the output signal produced by the peak detector circuit.

5. The circuit of claim 1 wherein the reference frequency generating circuit includes:
    1) a second tunable laser producing an optical output and having a frequency control input;
    2) a Fabry-Perot filter receiving the optical output of the second tunable laser and producing the optical reference signals in response to the optical output of the second tunable laser;
    3) a second photodetector receiving the optical reference signals and producing corresponding electrical reference signals, respectively;
    4) a control circuit producing a stepped output waveform and applying it to the frequency control input of the second tunable laser.

6. The circuit of claim 5 wherein the control circuit includes a comparator circuit responsive to the electrical reference signals, to set a monostable circuit if the frequency of the optical output of the second tunable laser is within one of the pass bands of the Fabry-Perot filter, a counter connected to count when the monostable circuit is not set and stop counting when the monostable circuit is set, and a digital-to-analog convertor coupled to produce a frequency control signal on the frequency control input of the second tunable laser.

7. A circuit generating a plurality of reference frequencies during a plurality of corresponding successive time intervals, comprising in combination:
    (a) a tunable laser producing an optical output and having a frequency control input; 6 (b) a Fabry-Perot filter receiving the optical output and producing the optical reference signals in pass bands of the Fabry-Perot filter in response to the optical output;
    (c) a photodetector receiving the optical reference signals and producing a corresponding electrical signal; and
    (d) a control circuit receiving the electrical signal, producing a multi-level waveform, and applying it to the frequency control input of the tunable laser, the control circuit including
  i. a threshold detection circuit responsive to the electrical signal and generating a digital signal,
  ii. a monostable circuit receiving the digital signal and generating a monostable pulse at a transition of the digital signal,
  iii. a counter circuit receiving the digital pulse and disabled to count during the presence of the digital pulse, and
  iv. a digital-to-analog converter circuit receiving an output of the counter circuit and generating the stepped output waveform proportional to the counter value.

8. A circuit in every transceiver of an optical frequency division multiplexing system that locks an optical frequency division multiplexing channel frequency with respect to a plurality of the reference frequencies, the circuit comprising in combination:
  (a) a tunable laser responsive to an electrical data input signal, and also responsive to a frequency control signal, and transmitting a data-modulated optical output signal via a first optical fiber to a star passive coupler;
  (b) a second optical fiber carrying a plurality of laser-produced signals in the optical frequency division multiplexing system coupled by the star passive coupler;
  (c) a polarizer adjusting the polarization of the output optical signal produced by the tunable laser;
  (d) a 2-to-1 coupler;
  (e) a 1-to-2 photonic switch directing the optical output signal to the first optical fiber after the frequency of the tunable laser has been locked to a reference frequency, and directing a resulting optical output signal to a 2-to-1 coupler during an initial frequency tracking stage, the 2-to-1 coupler combining the resulting optical output signal from the laser-produced signals via the second optical fiber to produce a combined optical signal;
  (f) a photodetector receiving the combined optical signal and producing an electrical signal proportional to the square of the combined optical signal, the electrical signal consisting of terms whose central frequencies are equal to a frequency difference of two optical signals in the combined signal;
  (g) an intermediate frequency filter circuit receiving the electrical signal from the photodetector, the intermediate frequency filter producing an output which is nonzero only if the electrical signal from the photodetector includes terms whose central frequencies are close to the intermediate frequency of the filter, the intermediate frequency of the intermediate frequency filter being equal to the frequency difference of an optical reference signal and a corresponding optical frequency division multiplexing channel frequency;
  (h) a peak detector circuit receiving the output of the intermediate frequency filter and producing an output signal representative of a peak of the output signal of the intermediate filter circuit;
  (i) a multiplication circuit generating an output proportional to a product of the peak detector output signal and the data input signal;
  (j) a first low pass filter circuit receiving the output of the peak detector circuit and generating an averaged value of the output of the intermediate frequency filter circuit to activate the servo circuit during the initial tracking stage;
  (k) a second low pass filter circuit receiving the output of the multiplication circuit and generating an averaged value of the output of the intermediate frequency filter circuit; and
  (l) a servo circuit adjusting the frequency control signal and adjusting a polarization control signal of the polarizer to maximize the output of the second low pass filter, the servo circuit being inactivated during an initial tracking operation during which the output of the first low pass filter is at a first level, the servo circuit being activated when the output of second low pass filter is at a second level after the initial tracking stage.

9. A method of operating an optical frequency division multiplexing system, comprising the steps of:
  (a) applying an electrical data input signal to a first tunable laser and transmitting a data-modulated optical output signal produced by the first tunable laser via a first optical fiber to a passive coupler;
  (b) generating a plurality of optical reference signals each having a different reference frequency during a plurality of successive time intervals, respectively;
  (c) transmitting a plurality of laser-produced signals from the passive coupler to a first photodetector by means of a second optical fiber to produce electrical signals including cross terms between the reference frequency signals and the data-modulated optical output signals;
  (d) applying the electrical signals from the first photodetector to an intermediate frequency filter circuit and producing an electrical output signal if a present reference frequency signal and a component of the data-modulated optical output signal are within a pass band of the intermediate frequency filter;
  (e) applying the electrical output signal produced by the intermediate frequency filter to a peak detector circuit and producing a signal at an output of the peak detector circuit representative of a peak of the output signal produced by the intermediate frequency filter circuit; and
  (f) operating a servo circuit in response to the signal produced by the peak detector circuit to produce an electrical frequency control signal, and applying the electrical frequency control signal to the first tunable laser to control the frequency of the data-modulated optical output signal;

whereby the optical output signal produced by the first tunable laser becomes locked to the present reference signal.

10. The method of claim 9 including filtering the signal produced by the peak detector circuit to produce a disable signal and disabling the servo circuit from controlling the first tunable laser during an initial time period, and mixing the signal produced by the peak detector circuit with the electrical data input signal to produce a mixed signal, and filtering the mixed signal to produce the electrical frequency control signal when the servo circuit is not disabled by the disable signal.

11. The method of claim 9 wherein step (c) includes the steps of:
  (1) operating a second tunable laser to produce an optical output signal;
  (2) applying the optical output signal produced by the second tunable laser to a Fabry-Perot filter to produce the optical reference signals in pass bands of the Fabry-Perot filter;

(3) applying the optical reference signals to a second photodetector to produce corresponding electrical signals;

(4) applying the corresponding electrical signals to a threshold detection circuit to generate a digital signal if one of the corresponding electrical signals is within a pass band of the Fabry-Perot filter;

(5) applying the digital signal to a monostable circuit to generate a monostable pulse at a transition of the digital signal;

(6) applying the monostable pulse to a counter circuit to disable its counting during the presence of the digital pulse;

(7) applying the outputs of the counter to inputs of a digital-to-analog converter circuit to generate a stepped output waveform signal proportional to contents of the counter; and (8) using the stepped output waveform signal as the electrical frequency control signal.

12. A method for generating a plurality of optical reference signals during a plurality of corresponding successive time intervals, the method comprising the steps of:

(a) operating a tunable laser to produce an optical output signal;

(b) applying the optical output signal to a Fabry-Perot filter to produce one of the optical reference signals if the optical output signal is within a pass band of the Fabry-Perot filter;

(c) applying the optical reference signal to a photodetector to produce a corresponding electrical signal;

(d) applying the corresponding electrical signal to a threshold detection circuit to generate a digital signal;

(e) applying the digital signal to a monostable circuit to generate an output pulse of the monostable circuit at a transition of the digital signal;

(f) applying the monostable pulse to a counter circuit to disable its counting during the presence of the digital pulse;

(g) applying the outputs of the counter to inputs of a digital-to-analog converter circuit to generate part of a multi-level output waveform signal proportional to the counter value;

(h) applying the output waveform signal to a frequency control input of the tunable laser; and (i) enabling the counter to count after the end of the output pulse of the monostable circuit.

13. A method of operating an optical frequency division multiplexing system, comprising the steps of:

(a) applying an electrical data input signal to a first tunable laser and transmitting a data-modulated optical output signal produced by the first tunable laser via a first optical fiber to a passive coupler;

(b) generating a plurality of optical reference signals each having a different reference frequency during a plurality of successive time intervals, respectively;

(c) transmitting a plurality of laser-produced signals from the passive coupler to a first photodetector by means of a second optical fiber to produce electrical signals including cross terms between the reference frequency signals and the data-modulated optical output signals;

(d) producing an electrical output signal if a present reference frequency signal and a component of the data-modulated output signal are within a pass band of a filtering device;

(e) producing a signal representative of a peak of the electrical output signal; and (f) producing an electrical frequency control signal in response to the signal representative of the peak, and applying the electrical frequency control signal to the first tunable laser to control a carrier frequency of the optical output signal;

whereby the optical output signal produced by the first tunable laser becomes locked to the present reference signal.

14. The method of claim 13 wherein step (c) includes the steps of:

(1) operating a second tunable laser to produce an optical output signal;

(2) applying the optical output signal produced by the second tunable laser to a Fabry-Perot filter to produce the optical reference signals;

(3) applying the optical reference signals to a second photodetector to produce corresponding electrical signals;

(4) generating a digital signal if one of the corresponding electrical signals is within a pass band of the Fabry-Perot filter;

(5) generating a pulse at a transition of the digital signal;

(6) producing a stepped output waveform signal having steps various edges of which correspond in time to times of occurrence of various corresponding edges of the pulse; and (7) using the stepped output waveform signal as the electrical frequency control signal.

15. In an optical frequency division multiplexing system, circuitry comprising in combination:

(a) a tunable laser responsive to an electrical data input signal and also responsive to a frequency control signal and transmitting a data-modulated optical output signal to a passive coupler;

(b) means for carrying a plurality of laser-produced signals produced by remotely located lasers and coupled by the passive coupler;

(c) a reference frequency generating circuit operating to generate a plurality of optical reference signals from a single light source, each of the optical reference signals having a different reference frequency;

(d) a frequency tracking circuit including (i) a photodetector receiving various optical signals from the carrying means and producing corresponding electrical signals including cross terms between the reference frequency signals and the data-modulated optical output signal;

(ii) a filter circuit receiving the electrical signals from the photodetector and the cross terms and producing an output signal if a frequency difference between a present reference frequency signal and a data-modulated optical output signal component in the electrical signals produced by the photodetector is within the pass band of the filter;

(iii) a detector circuit receiving the output signal of the filter and producing a signal representative of predetermined feature of the output signal of the filter circuit, and (iv) a servo circuit responsive to the signal produced by the detector circuit for producing the frequency whereby the optical output signal produced by the first tunable laser becomes locked to the present reference signal.

16. A method of operating an optical frequency division multiplexing system, comprising the steps of:
   (a) applying an electrical data input signal to a tunable laser and transmitting a data-modulated optical output signal produced by the tunable laser to a passive coupler;
   (b) generating a plurality of optical reference signals by means of a single light source, each of the optical reference signals having a different reference frequency;
   (c) transmitting a plurality of laser-produced signals produced by remotely located lasers, respectively, from the passive coupler to a photodetector to produce electrical signals including cross terms between the reference frequency signals and the data-modulated optical output signals;
   (d) producing an electrical output signal if a present reference frequency signal and a component of the data-modulated output signal are within a pass band of a filtering device;
   (e) producing a signal representative of a predetermined feature of the electrical output signal; and
   (f) producing a frequency control signal in response to the signal representative of the predetermined feature, and applying the frequency control signal to the tunable laser to control a carrier frequency of the data-modulated optical output signal;
whereby the optical output signal produced by the tunable laser becomes locked to the present reference signal.

17. A circuit generating a plurality of reference signals during a plurality of corresponding successive time intervals, comprising in combination:
   (a) a tunable laser producing an optical output signal and having a frequency control input;
   (b) an optical filter receiving the optical output signal and producing the optical reference signals in pass bands of the filter in response to the optical output signal;
   (c) a photodetector receiving the optical reference signals and producing a corresponding electrical signal; and
   (d) a control circuit receiving the electrical signal, producing a multi-level waveform, and applying it to the frequency control input of the tunable laser.

* * * * *